United States Patent
Park et al.

(10) Patent No.: US 9,219,513 B2
(45) Date of Patent: Dec. 22, 2015

(54) WIRELESS COMMUNICATION SYSTEM

(71) Applicant: ELECTRONICS AND TELECOMMUNICATIONS RESEARCH INSTITUTE, Daejeon-si (KR)

(72) Inventors: Ju Derk Park, Daejeon (KR); Ho Yong Kang, Daejeon (KR); In Hwan Lee, Daejeon (KR); Cheo Sig Pyo, Daejeon (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 13 days.

(21) Appl. No.: 14/086,451

(22) Filed: Nov. 21, 2013

(65) Prior Publication Data
US 2014/0141847 A1    May 22, 2014

(30) Foreign Application Priority Data

Nov. 22, 2012    (KR) .......................... 10-2012-0133188

(51) Int. Cl.
| | | |
|---|---|---|
| *H04B 1/3827* | (2015.01) | |
| *H01Q 1/24* | (2006.01) | |
| *H01Q 1/38* | (2006.01) | |

(52) U.S. Cl.
CPC ............. *H04B 1/3827* (2013.01); *H01Q 1/243* (2013.01); *H01Q 1/38* (2013.01)

(58) Field of Classification Search
CPC .................................. H01Q 1/22; H01Q 1/24
USPC ......... 343/702, 850, 860, 874, 875, 890, 898; 455/575
See application file for complete search history.

(56) References Cited

U.S. PATENT DOCUMENTS

| | | | |
|---|---|---|---|
| 2006/0155783 A1* | 7/2006 | DeWitt et al. ................. | 707/203 |
| 2008/0055186 A1* | 3/2008 | Fortson et al. ................ | 343/873 |
| 2010/0289716 A1 | 11/2010 | Lenzi et al. | |
| 2010/0304785 A1* | 12/2010 | Marlett et al. ............. | 455/552.1 |
| 2011/0230160 A1* | 9/2011 | Felgate ..................... | 455/404.1 |
| 2012/0178382 A1 | 7/2012 | Merz et al. | |

FOREIGN PATENT DOCUMENTS

| | | |
|---|---|---|
| JP | H05-152819 A | 6/1993 |
| KR | 20-0393254 Y1 | 8/2005 |

OTHER PUBLICATIONS

Tallysman Data Sheet: TW3430/TW3432 GPS/GLONASS Timing Dec. 31, 2011.*

* cited by examiner

*Primary Examiner* — Vladimir Magloire
*Assistant Examiner* — Ernest Tacsik
(74) *Attorney, Agent, or Firm* — Rabin & Berdo, P.C.

(57) ABSTRACT

Disclosed is a wireless communication system. The wireless communication system includes an embedded-type antenna embedded in a base, and a wireless communication unit including a communication unit that is connected to the embedded-type antenna and exchanges information with an external device, and a housing that is arranged to surround the communication unit, wherein at least one of the communication unit and the housing performs transmission and reception of electric waves as a substitute of the embedded-type antenna.

8 Claims, 7 Drawing Sheets

WIRELESS COMMUNICATION SYSTEM

Priority to Korean patent application number 10-2012-0133188 filed on Nov. 22, 2012, the entire disclosure of which is incorporated by reference herein, is claimed.

BACKGROUND OF THE INVENTION

1. Field of the Invention

The present invention relates to a wireless communication system, and more particularly, to a wireless communication system having an antenna.

2. Discussion of the Related Art

Generally, a wireless communication system is connected to a service provider of a communication service through a wireless communication network.

The service provider provides various services to the wireless communication system. The wireless communication system includes an antenna for linkage with the wireless communication network. The antenna may be arranged at the inside or outside of a wireless communication unit. The antenna may be set so that electric waves provided from the wireless communication unit are radiated, or electric waves provided from an external device are received to be provided to the wireless communication unit.

For example, the conventional technology about an antenna is disclosed in Korean Utility Model No. 20-0393254 (Aug. 10, 2005; an external antenna with extension possibility). The registered invention relates to an external antenna. According to the registered invention, an antenna is detachably connected to an external side of a wireless communication unit, and convenience is improved in terms of storage and portability of the wireless communication system. However, the registered invention has a problem that alien substances such as moisture may flow in through an antenna port which is a connection part between the antenna and the wireless communication unit, and thus the transmission and reception efficiency may be deteriorated. Furthermore, according to the registered invention, an antenna is exposed to an external side, and thus the antenna may be damaged depending on the installed environment.

Furthermore, FIG. 4 illustrates a radial shape of a wireless communication system according to a conventional art, and FIG. 5 illustrates a radial shape of a dipole type wireless communication system according to a convention art.

In the wireless communication system of FIG. 4, an antenna 32 is connected to an external side of a wireless communication unit 31. Furthermore, a communication unit 33 that generates radio frequency (RF) signals may be arranged at the inside of the wireless communication unit 31. The communication unit 33 is connected to the antenna 32 connected to the external side of the wireless communication unit 31 and the ground part of the internal side of the wireless communication unit 31, respectively. However, with the miniaturization trend of the wireless communication system 30, the size of the wireless communication unit 31 is not significantly large compared to that of the antenna 32, and thus the radial shape R5 of the wireless communication unit 31 becomes similar to the radial shape R6 of the dipole antenna 40.

In the dipole antenna 40 of FIG. 5, a pair of antennas 42 and 42' are connected to an external side of the wireless communication unit 41. Furthermore, a communication unit 43 that generates RF signals is arranged at the internal side of the wireless communication unit 41 so that signals may be transmitted and received through a pair of antennas 42 and 42'. At this time, the radial shape R6 of the dipole antenna 40 may be similar to the radial shape R5 of the wireless communication system 30 illustrated in FIG. 4.

That is, in the wireless communication system 30 according to the conventional art illustrated in FIG. 4, the electric waves are radiated in the wireless communication unit 31 itself. Hence, in the wireless communication system, a radial shape R5 similar to the radial shape R6 of the dipole antenna 40 illustrated in FIG. 5 may be formed. At this time, the amount of electric waves radiated in the wireless communication unit may be similar to the amount of electric waves radiated from the antenna 32.

Hence, there is a need for a wireless communication system that may prevent deterioration of transmission and reception efficiency and a damage of an antenna while electric waves are transmitted and received in the wireless communication unit itself.

SUMMARY OF THE INVENTION

An object of the present invention is to provide a wireless communication system in which electric waves are transmitted and received in a housing of a wireless communication unit.

Another object of the present invention is to provide a wireless communication system for preventing a damage of an antenna by an installation environment by not exposing the antenna to an external side while preventing alien substances such as moisture from flowing into an inside of the wireless communication unit depending on the installation environment of the wireless communication system.

In accordance with an aspect of the present invention, a wireless communication system includes an embedded-type antenna embedded in a base, and a wireless communication unit including a communication unit that is connected to the embedded-type antenna and exchanges information with an external device, and a housing that is arranged to surround the communication unit, wherein at least one of the communication unit and the housing performs transmission and reception of electric waves as a substitute of the embedded-type antenna.

The embedded-type antenna may include an antenna housing whose lower part is formed in a cone shape, a matching unit that is arranged at an upper part of the antenna housing and performs impedance matching, and a connection unit that connects the embedded-type antenna to the housing at an upper end of the matching unit.

The matching unit may include a dielectric.

The embedded-type antenna may further include a connection pin that is arranged to pass through the matching unit from an upper end of the antenna housing, and the connection pin may be connected to a connection module that is connected to the communication unit at an inside of the housing.

The communication unit may include a communication module that performs overall control of the communication unit, a first cable that connects the communication module to the embedded-type antenna, and a second cable that connects the communication module to an internal side of the housing.

The communication module may include a printed circuit board (PCB) and a flexible printed circuit board (FPCB).

The communication module may be detachably arranged in a plurality of support members formed at an internal side of the housing.

The plurality of support members may be projected from the internal side of the housing, and the communication module may be supported between the plurality of support members.

The housing may include a first housing that is connected to the embedded-type antenna and a second housing that is coupled with the first housing at an upper side of the first housing, and the first and second housings may be formed in a cylinder shape.

In accordance with another aspect of the present invention, a wireless communication unit includes a communication unit that is connected to an embedded-type antenna embedded in a base and exchanges information with an external device, and a housing that is arranged to surround the communication unit, wherein at least one of the communication unit and the housing performs transmission and reception of electric waves as a substitute of the embedded-type antenna.

The communication unit may include a communication module that performs overall control of the communication unit, a first cable that connects the communication module to the embedded-type antenna, and a second cable that connects the communication module to an internal side of the housing.

The communication module may include a printed circuit board (PCB) and a flexible printed circuit board (FPCB).

In accordance with another aspect of the present invention, an embedded-type antenna includes an antenna housing including a communication unit that exchanges information with an external device, and a housing that is arranged to surround the communication unit, the antenna housing being connected to a wireless communication unit and whose lower part is embedded in a base, and a matching unit that is arranged between the wireless communication unit and the antenna housing, and performs impedance matching, wherein at least one of the communication unit and the housing performs transmission and reception of electric waves as a substitute of the antenna.

A lower part of the antenna housing may be formed in a cone shape.

The matching unit may include a dielectric.

The embedded-type antenna may further include a connection pin that is arranged to pass through the matching unit from an upper end of the antenna housing, and the connection pin is connected to a connection module that is connected to the communication unit at an inside of the housing.

DETAILED DESCRIPTION OF THE EMBODIMENTS

Figure 1:
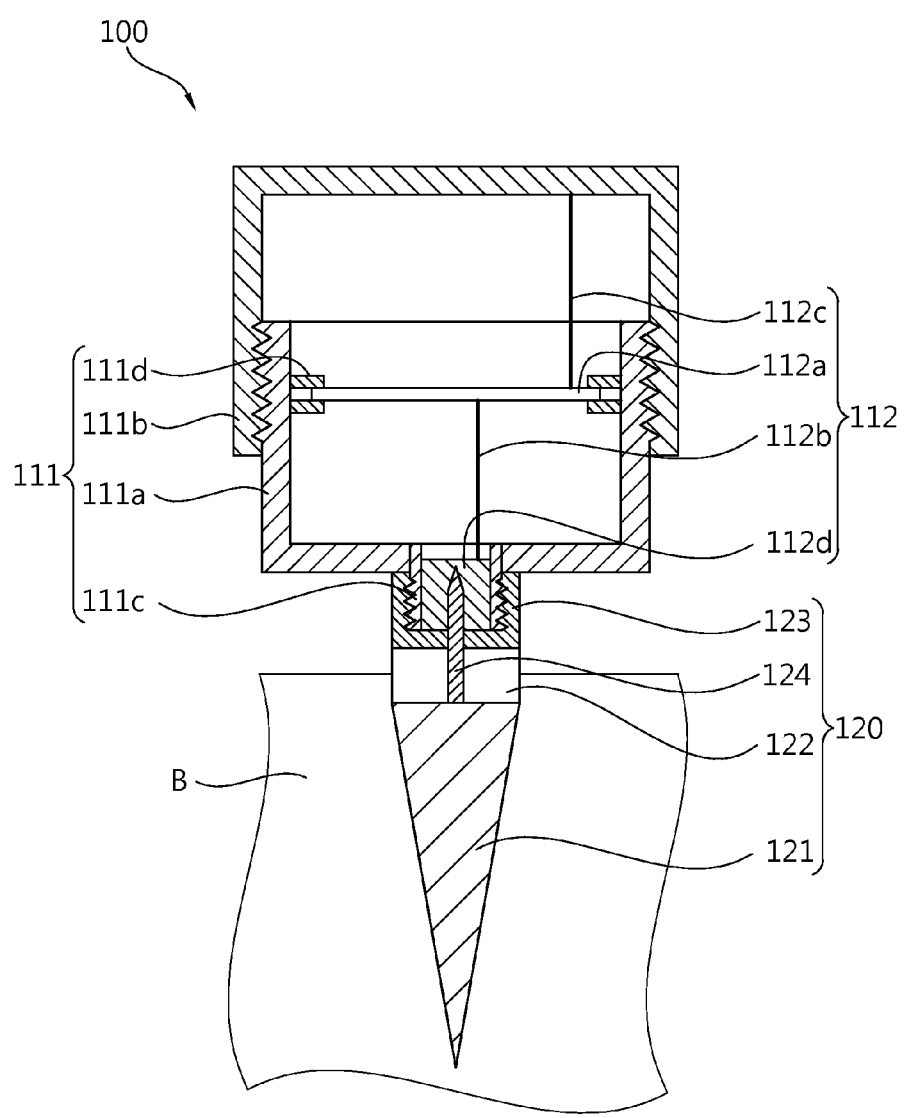
FIG. 1 is a cross-sectional view showing a wireless communication system according to an embodiment of the present invention.

Hereinafter, embodiments of the present invention will be described in detail with reference to the accompanying drawings so that they can be readily implemented by those skilled in the art.

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

FIG. 1 is a cross-sectional view showing a wireless communication system according to an embodiment of the present invention.

As illustrated in FIG. 1, a wireless communication system 100 according to an embodiment of the present invention includes a wireless communication unit 110 and an embedded-type antenna 120.

The wireless communication unit 110 is linked with a service provider of a communication service through a wireless communication network. For example, the wireless communication unit 110 may include a housing 111 and a communication unit 112.

The housing forms an external form of the wireless communication unit 110. The housing may be formed of a cylinder shape where an internal space is formed. Furthermore, the housing 111 may include a first housing 111$a$, a second housing 111$b$, and a first connection unit 111$c$.

The first housing 111$a$ forms a lower area of the housing 111. In the first housing, the upper end may be opened so that an internal space may be formed. Also, the second housing 111$b$ forms an upper area of the housing 111. In the second housing 111$b$, a lower end may be opened so that an internal space may formed, and the lower end of the second housing 111$b$ may be coupled with the upper part of the first housing 111$a$. The first and second housings 111$a$ and 111$b$ may be formed of metal, and a space including the communication unit 112 is formed.

The first connection unit 111$c$ is arranged on the external bottom surface of the first housing 111$a$. The first connection unit 111$c$ connects the embedded-type antenna 120 to the lower end of the housing 111. For example, the first connection unit 111$c$ may be formed as a cylinder shape at the central part of the external bottom surface of the first housing 111$a$, and may be linked with the internal side of the first housing 111$a$.

Furthermore, the communication unit 112 is arranged at the internal side of the housing 111. The communication unit 112 may be linked with the wireless communication network, and information may be exchanged with an external device through the wireless communication network. For example, the communication unit 112 may include a communication module 112$a$, a first cable 112$b$, a second cable 112$c$, and a connection module 112$d$.

The communication module 112$a$ may be detachably arranged at the inside of the housing 111. For example, the communication module 112$a$ is detachably arranged in a support member 111$d$ which is projected from the internal side of the housing.

A plurality of support members 111d are provided and are separately arranged. Furthermore, the communication module 112a may be inserted into a plurality of support members 111d so that the edge of the communication module 112a may be supported by the housing 111.

The communication module 112a may include a printed circuit board (PCB) or a flexible printed circuit board (FPCB), and performs overall control of the wireless communication system 100. For example, the communication module 112a may receive information provided through a wireless communication network from an external device. Furthermore, the communication module 112a may send information to be provided to an external device by control of the client. Furthermore, the communication module 112a may only play a role of relaying electric waves.

Furthermore, it is illustrated in the present embodiment that transmission and reception of electric waves is performed in the housing 111, but the wireless communication system according to an embodiment of the present invention may perform transmission and reception of electric waves instead of the embedded-type antenna 120 or the housing 111.

Furthermore, the communication 112 is connected to the embedded-type antenna 120 through the first cable 112b. For example, one end of the first cable 112 is connected to the communication module 112a, and the other end of the first cable 112b is connected to the connection module 112d. Hence, the communication module 112a and the embedded-type antenna 120 may be mutually connected.

Furthermore, the communication unit 112 and the housing 111 are connected through the second cable 112c. For example, one end of the second cable 112c may be connected to the communication module 112a, and the other end of the second cable 112c may be connected to the internal side of the housing 111.

Hence, when the communication module 112a tries to transmit/receive information with an external device, the housing 111 may perform transmission and reception of electric waves instead of the embedded-type antenna 120.

The connection module 112d is arranged at an internal side of the housing 111. For example, the connection module 112d may be arranged at an internal space of the first connection unit 111c. The connection module 112d is connected to a connection pin 124 arranged in the embedded-type antenna 120. The connection module 112d includes a pin connector into which the connection pin 124 is inserted so that the embedded-type antenna 120 is connected with the communication unit 112 through the second cable when the housing 111 and the embedded-type antenna 120 are connected.

Furthermore, the lower part of the embedded-type antenna 120 may be embedded in the base B, and the upper part of the embedded-type antenna 120 may be connected to the housing 111. Here, the base B may refer to a ground or wall that provides a space where the embedded-type antenna 120 is embedded. Furthermore, the embedded-type antenna 120 may include a housing 121, a matching unit 122, a second connection unit 123, and a connection pin 124.

The antenna housing 121 includes a taper toward the lower end. That is, the antenna housing 121 is formed in a cone shape directed toward the base B so that the embedded-type antenna 120 may be easily embedded in the base B. Furthermore, the antenna housing 121 may include metal materials.

The matching unit 122 is arranged to be exposed to an external side at the upper side of the antenna housing 121. When the antenna housing 121 is embedded in the base B, a part of the matching unit 122 may be embedded in the base B. The matching unit 122 performs impedance matching. Furthermore, the matching unit 122 may include a dielectric.

The second connection unit 123 may be arranged at the external wall of the antenna housing 121 so that the first connection unit 111c may be connected with the antenna housing 121. For example, the second connection unit 123 may be arranged at the upper central part of the matching unit 122. The second connection unit may be formed in a cylinder shape having a diameter larger than that of the first connection unit 111c. The upper end of the second connection unit 123 may be opened to have an internal space so that the second connection unit 123 may be coupled with the first connection unit 111c.

The antenna housing 121 is connected with the communication unit 112 through the connection pin 124. The connection pin 124 may be arranged in the internal space of the second connection unit 124 at the upper end of the matching unit 122. The connection pin 124 may be formed to pass through the matching unit 122 from the antenna housing 121. The connection pin 124 is inserted into the connection module 112d when the first and second connection units 111c and 123 are coupled. The connection pin 124 connects the embedded-type antenna 120 to the communication unit 112 through the second cable 112c. Furthermore, the connection pin 124 may contain metal materials.

Furthermore, the embedded-type antenna 120 is embedded in the base B so that impedance matching is performed at the installation of the wireless communication system 100.

At this time, the electric waves radiated from the embedded-type antenna 120 are absorbed in the base B, and thus radiation of the electric waves is rarely performed in the embedded-type antenna 120. However, in the housing 111, the radiation of electric waves is performed according to the electric waves applied from the communication module 112a through the second cable 112c.

That is, the wireless communication system 100 allows the housing 111 to perform transmission and reception of electric waves instead of the embedded-type antenna 120. That is, the wireless communication system allows the housing to perform transmission and reception of electric waves between an external device and a communication unit.

Figure 2A:
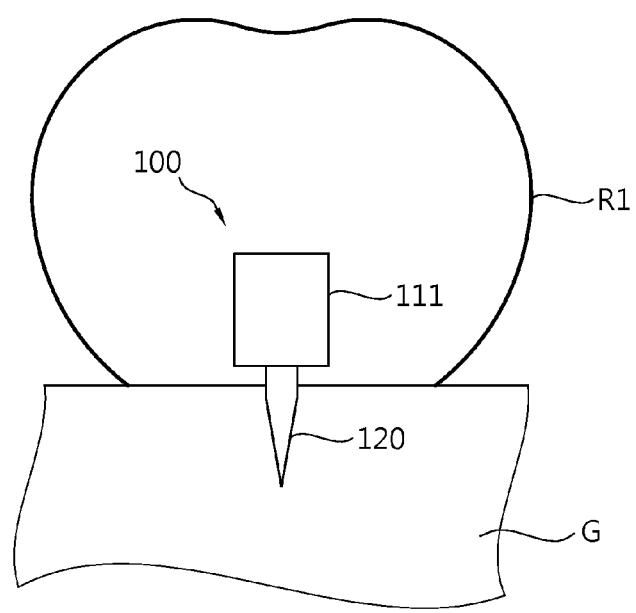
FIG. 2A is a view showing a radial shape of a wireless communication system according to an embodiment of the present invention.
Figure 2B:
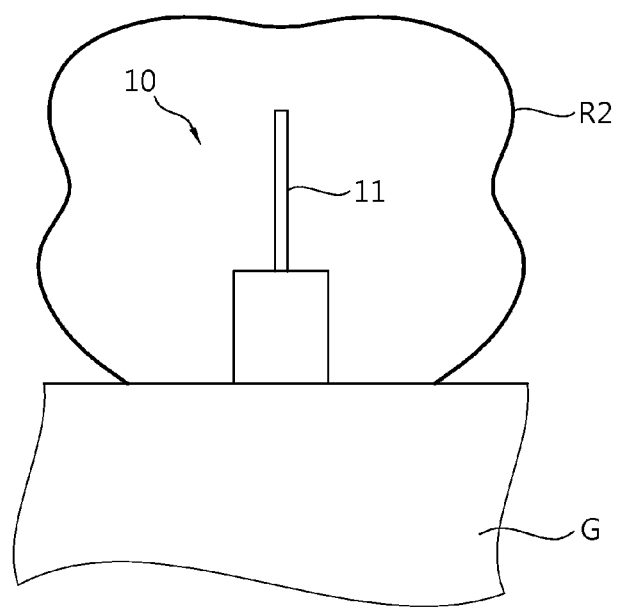
FIG. 2B is a view showing a radial shape of a wireless communication system according to an embodiment of the conventional art.

FIG. 2A is a view showing a radial shape of a wireless communication system according to an embodiment of the present invention. FIG. 2B is a view showing a radial shape of a wireless communication system according to an embodiment of the conventional art.

Here, FIG. 2A is a view showing a radial shape R1 when the embedded-type antenna 120 of the wireless communication system 100 according to the present embodiment is embedded in the ground G, and the housing 111 performs a role of an antenna. Furthermore, FIG. 2B is a view showing a radial shape R2 when the conventional wireless communication system 10 is positioned on the ground G, and electric waves are transmitted and received by the antenna 11.

As illustrated in FIG. 2, the radial shape R1 of the wireless communication system according to the present embodiment may be different from the radial shape R2 of the conventional wireless communication unit 10. However, the wireless communication system 100 according to the present embodiment and the conventional wireless communication system 10 are similar in the gain and electric field strength in the ground G and the transmission and reception efficiency of electric waves.

That is, the transmission and reception efficiency of electric waves in the antenna 11 of the conventional wireless communication system 10 is similar to the transmission and reception efficiency of the electric waves in the housing 111 of the wireless communication system 100 according to the present embodiment, and thus in the wireless communication system 100 according to the present embodiment, the transmission and reception of the electric waves may be smoothly performed even if the embedded-type antenna 120 is embedded in the ground G.

Hereinafter, radial shapes of a wireless communication system according to another embodiment of the present invention and the conventional wireless communication system will be described with reference to the attached drawings. The same reference numbers will be used for the above described components, and the detailed description thereof will be omitted.

Hence, the description-omitted components in the description below will be understood with reference to the above description.

Figure 3A:
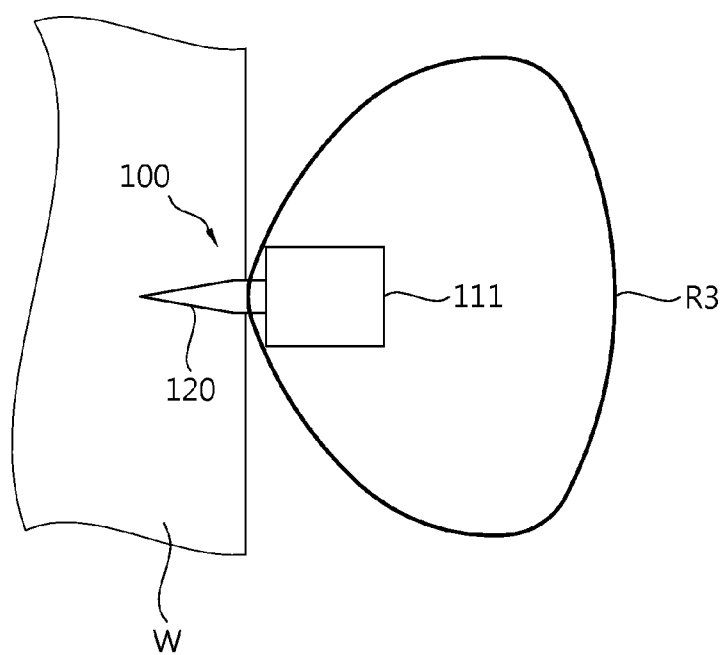
FIG. 3A is a view showing comparison of a radial shape of a wireless communication system according to another embodiment of the present invention.
Figure 3B:
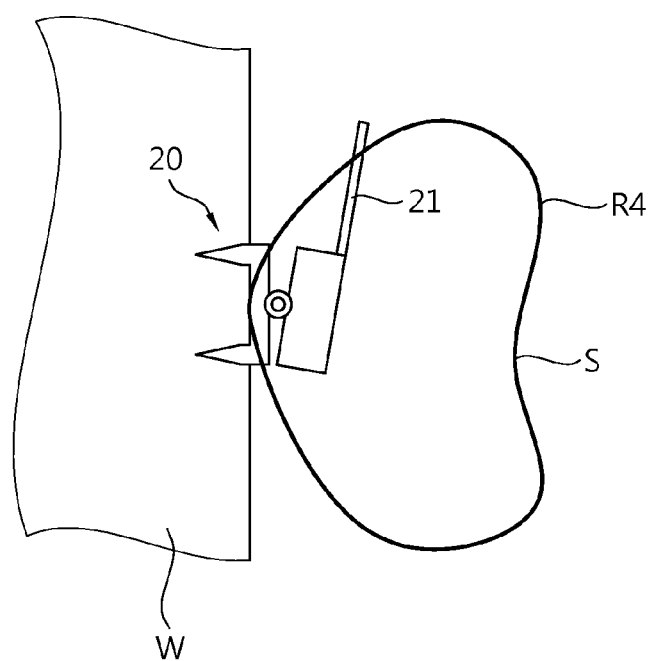
FIG. 3B is a view showing comparison of a radial shape of a wireless communication system according to another embodiment of the conventional art.
Figure 4:
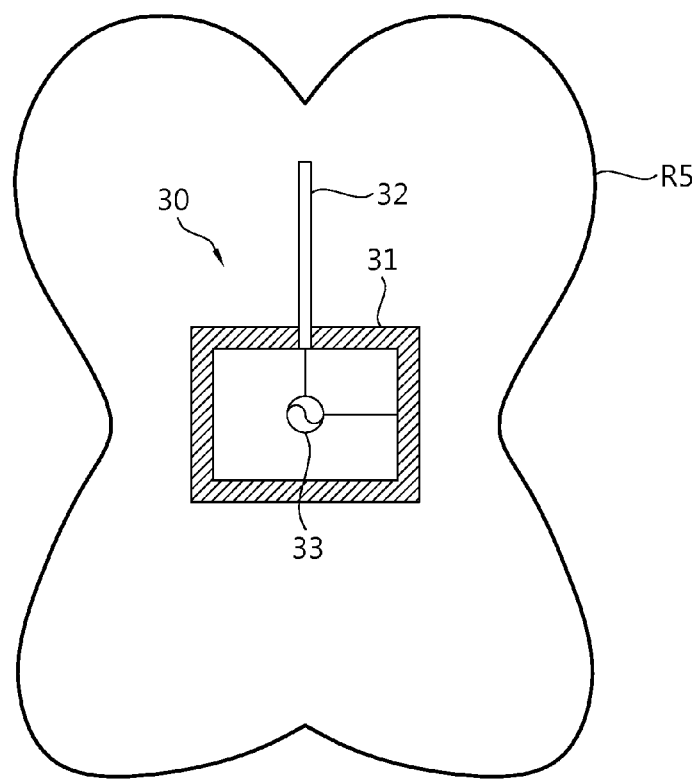
FIG. 4 is a view showing a radial shape of a wireless communication system according to a conventional art.
Figure 5:
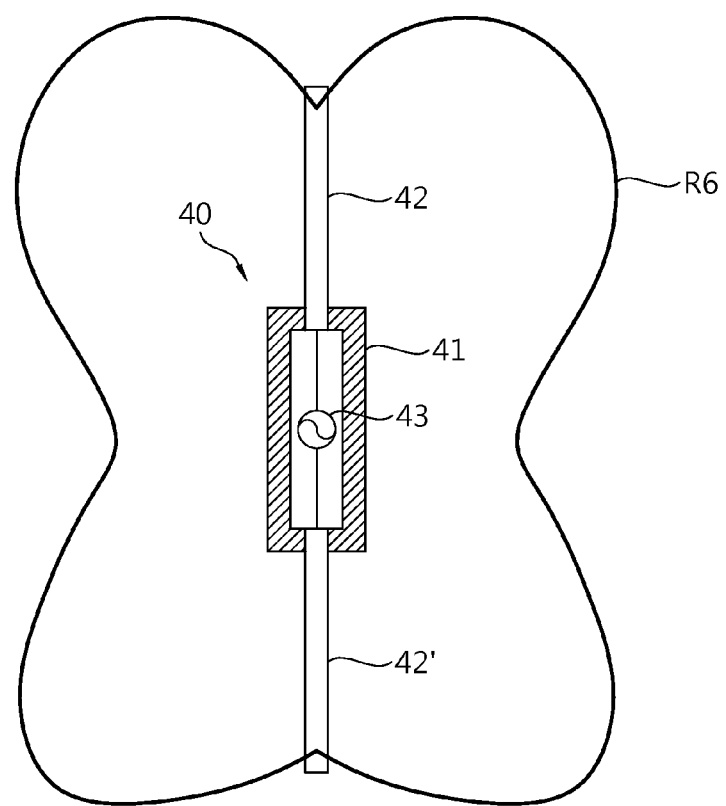
FIG. 5 is a view showing a dial shape of a dipole type wireless communication system according to a conventional art.

FIG. 3A is a view showing comparison of a radial shape of a wireless communication system according to another embodiment of the present invention. And FIG. 3B is a view showing comparison of a radial shape of a wireless communication system according to another embodiment of the conventional art.

Here, FIG. 3A is a view showing a radial shape R3 when the embedded-type antenna 120 of the wireless communication system 100 according to the present embodiment is supported by the wall W, and the housing performs a role of the embedded-type antenna 120 as a substitute. Furthermore, FIG. 3B is a view showing a radial shape R4 when a monopole type wireless communication system 20 according to the conventional art is supported by the wall W, and transmission and reception are performed by the antenna 21. As illustrated in FIG. 3, the wireless communication system according to the present embodiment performs transmission and reception of electric waves in the housing 111 itself, and thus a stable radial shape R3 may be formed. However, in the monopole type wireless communication system 20 according to the conventional art, a coverage hole S may be generated in the radial shape R4 if only the size of the case is a little smaller than the size of the antenna 21.

That is, according to the wireless communication system 100 of the present embodiment, a stable radial shape R3 may be formed, and thus the deterioration of the transmission and reception efficiency of the electric waves may be prevented. However, according to the monopole type wireless communication system 20 of the conventional art, a coverage hole S may be generated, and thus the transmission and reception efficiency of electric waves may be deteriorated compared with the wireless communication system 100 according to the present embodiment.

It is described in the present embodiment that the housing 111 performs transmission and reception of electric waves of the wireless communication system 100 as a substitute of the embedded-type antenna 120, but according to the wireless communication system 100 of the present embodiment, at least one of the communication unit 112 and the housing may perform transmission and reception of electric waves as a substitute of the embedded-type antenna 120.

According to a wireless communication system of the present invention, electric waves are transmitted and received in a wireless communication unit itself, and thus electric waves may be transmitted and received anywhere without a coverage hole where the communication service cannot be provided.

Furthermore, according to a wireless communication of the present invention, a damage of an antenna according to the installation environment of the wireless communication system may be prevented, and deterioration of transmission and reception efficiency due to the inflow of alien substances such as moisture may be prevented.

A person having ordinary skill in the art to which the present invention pertains may change and modify the present invention in various ways without departing from the technical spirit of the present invention. Accordingly, the present invention is not limited to the above-described embodiments and the accompanying drawings.

What is claimed is:

1. A wireless communication system comprising:
an embedded-type antenna embedded in a base; and
a wireless communication unit including a communication unit that is connected to the embedded-type antenna and exchanges information with an external device, and a housing that is arranged to surround the communication unit, wherein at least one of the communication unit and the housing performs transmission and reception of electric waves as a substitute of the embedded-type antenna:
wherein the embedded-type antenna has a lower side in contact with the base and an upper side not in contact with the base, and the wireless communication unit is disposed on the upper side of the embedded-type antenna, and the embedded-type antenna is disposed between the base and the wireless communication unit, such that the wireless communication unit is supported by the embedded-type antenna and the wireless communication unit is fixed to the base by the embedded-type antenna;
wherein the communication unit includes a communication module that performs overall control of the communication unit, a first cable that connects the communication module to the embedded-type antenna, and a second cable that connects the communication module to an internal side of the housing.

2. The wireless communication system of claim 1, wherein the housing includes a first connection unit, and the communication unit includes a communication module disposed at an internal space of the first connection unit,
wherein the embedded-type antenna includes:
an antenna housing whose lower part is formed in a cone shape and is embedded in the base;
a matching unit that is arranged at an upper part of the antenna housing and performs impedance matching;
a connection pin passing through the matching unit from an upper end of the antenna housing, the connection pin being inserted into the connection module; and
a second connection unit coupled with the first connection unit, the second connection unit having a diameter larger than a diameter of the first connection unit.

3. The wireless communication system of claim 2, wherein the matching unit includes a dielectric.

4. The wireless communication system of claim 1, wherein the communication module includes a printed circuit board (PCB) and a flexible printed circuit board (FPCB).

5. The wireless communication system of claim 1, wherein the communication module is detachably arranged in a plurality of support members formed at an internal side of the housing.

6. The wireless communication system of claim 5, wherein the plurality of support members are projected from the internal side of the housing, and the communication module is supported between the plurality of support members.

7. The wireless communication system of claim 1, wherein the housing includes a first housing that is connected to the embedded-type antenna and a second housing that is coupled with the first housing at an upper side of the first housing, and the first and second housings are formed in a cylinder shape.

8. The wireless communication system of claim 2, wherein a part of the matching unit is embedded in the base and the remaining part of the matching unit is protruding out of the base.

* * * * *